(12) United States Patent
Hagman et al.

(10) Patent No.: US 11,415,465 B2
(45) Date of Patent: Aug. 16, 2022

(54) INFRARED SENSOR ARRAY WITH ALTERNATING FILTERS

(71) Applicant: FLIR Systems AB, Täby (SE)

(72) Inventors: Henning Hagman, Täby (SE); Marta Barenthin-Syberg, Stockholm (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 16/428,898

(22) Filed: May 31, 2019

(65) Prior Publication Data

US 2019/0285477 A1 Sep. 19, 2019

Related U.S. Application Data

(63) Continuation of application No. PCT/US2017/064759, filed on Dec. 5, 2017.
(Continued)

(51) Int. Cl.
*G01J 5/10* (2006.01)
*G01J 5/00* (2022.01)
(Continued)

(52) U.S. Cl.
CPC . *G01J 5/10* (2013.01); *G01J 3/36* (2013.01); *G01J 5/0014* (2013.01); *G01J 5/027* (2013.01); *G01J 5/03* (2022.01); *G01J 5/0802* (2022.01); *G01N 21/3504* (2013.01); *G02B 5/208* (2013.01); *H04N 5/33* (2013.01); *G01J 2005/106* (2013.01); *G01N 2021/3531* (2013.01)

(58) Field of Classification Search
CPC .... G01J 5/10; G01J 3/36; G01J 5/0014; G01J 5/027; G01J 5/0862; G01J 5/505; G01J 2005/106; G01J 5/025; G01J 2005/0077; G01J 5/0831; G01J 5/06; G01J 2005/066; G01J 5/0285; H04N 5/33; G01N 21/3504; G01N 2021/3531; G02B 5/208
See application file for complete search history.

(56) References Cited

U.S. PATENT DOCUMENTS 4,956,686 A 9/1990 Borrello et al.
5,157,258 A 10/1992 Gunning, III et al.
(Continued)

FOREIGN PATENT DOCUMENTS

WO WO 2005/068955 7/2005
WO WO 2016/139261 9/2016

*Primary Examiner* — Marcus H Taningco
(74) *Attorney, Agent, or Firm* — Haynes and Boone, LLP

(57) ABSTRACT

Improved techniques for thermal imaging and gas detection are provided. In one example, a system includes a first set of filters configured to pass first filtered infrared radiation comprising a first range of thermal wavelengths associated with a background portion of a scene. The system also includes a second set of filters configured to pass second filtered infrared radiation comprising a second range of thermal wavelengths associated with a gas present in the scene. The first and second ranges are independent of each other. The system also includes a sensor array comprising adjacent infrared sensors configured to separately receive the first and second filtered infrared radiation to capture first and second thermal images respectively corresponding to the background portion and the gas. Additional systems and methods are also provided.

20 Claims, 6 Drawing Sheets

Related U.S. Application Data

(60) Provisional application No. 62/430,283, filed on Dec. 5, 2016.

(51) Int. Cl.
*G01J 5/02* (2022.01)
*G02B 5/20* (2006.01)
*H04N 5/33* (2006.01)
*G01J 3/36* (2006.01)
*G01N 21/3504* (2014.01)
*G01J 5/03* (2022.01)
*G01J 5/0802* (2022.01)

(56) References Cited

U.S. PATENT DOCUMENTS

| | | | | |
|---|---|---|---|---|
| 5,258,618 | A * | 11/1993 | Noble | G01J 5/0802 |
| | | | | 250/332 |
| 8,559,721 | B1 | 10/2013 | Bartholomew | |
| 8,766,808 | B2 | 7/2014 | Hogasten | |
| 2010/0301214 | A1 | 12/2010 | Jonsson | |
| 2015/0371386 | A1* | 12/2015 | Zeng | G01S 5/021 |
| | | | | 382/171 |
| 2016/0037089 | A1 | 2/2016 | Silny et al. | |
| 2018/0045567 | A1* | 2/2018 | Cabib | G01J 3/36 |

* cited by examiner

INFRARED SENSOR ARRAY WITH ALTERNATING FILTERS

CROSS-REFERENCE TO RELATED APPLICATIONS

This application is a continuation of International Patent Application No. PCT/US2017/064759 filed Dec. 5, 2017 and entitled "INFRARED SENSOR ARRAY WITH ALTERNATING FILTERS," which is incorporated herein by reference in its entirety.

International Patent Application No. PCT/US2017/064759 filed Dec. 5, 2017 claims the benefit of and priority to U.S. Patent Application No. 62/430,283 filed Dec. 5, 2016 and entitled "INFRARED SENSOR ARRAY WITH ALTERNATING FILTERS," which is hereby incorporated by reference in its entirety.

TECHNICAL FIELD

The present invention relates generally to thermal imaging and, more particularly, to gas detection using thermal images.

BACKGROUND

In the field of optical gas imaging (OGI), various techniques are employed to detect the presence gases. For example, specific gases may emit and/or absorb thermal radiation in characteristic ways at particular wavelengths. Thermal images may be captured of a scene and analyzed to determine the presence or absence of thermal radiation at certain wavelengths. By comparing these wavelengths to the wavelengths associated with known gases, the presence of a particular gas of interest may be determined.

When a scene is thermally imaged in accordance with such techniques, it is generally preferred to remove the background radiation that is not associated with the gas of interest. In some cases, this may be performed without filtering. For example, certain operations may be employed to subtract sequentially captured thermal images and detect the presence of a gas based on small frame-to-frame changes. Unfortunately, such subtraction may remove a disproportionally large portion of the image associated with the gas and cannot be used for quantification.

Other techniques rely on filtering. For example, thermal radiation from a target scene may be received by a beam splitter and passed therefrom to separate sensor arrays. This approach permits the sensor arrays to be filtered differently and the integration periods of the sensor arrays may be independently calibrated such that the resulting images from the different sensor arrays are balanced with each other. Unfortunately, such an approach requires precise alignment (e.g., optical, mechanical, and temporal) among the beam splitter and the detector arrays to avoid faulty images caused by, for example, vibration of the system components, time misalignment of the images captured by the different arrays, and other factors. As a result, such systems are generally costly, require high power, and are relatively large and heavy to implement.

In another filter-based approach, thermal radiation may be independently received by the separate detector arrays without the use of a beam splitter. Although this reduces some of the complexity of the previously-discussed approach and similarly permits independent filtering and calibration of the detector arrays, the thermal images captured by the separate detector arrays will nevertheless exhibit parallax with respect to each other. In addition, this approach still suffers from the various alignment, cost, power, and size limitations discussed above.

Thus, there is a need for an improved approach to thermal imaging that permits reliable capture of multiple thermal images of a target scene to permit accurate and reliable gas detection.

SUMMARY

Improved techniques for thermal imaging and gas detection are provided. Different infrared sensors (e.g., detectors) of a single focal plane array (FPA) may be separately filtered by at least two types of filters that are interleaved with each other and distributed over the entirety of the FPA's infrared sensors. As a result, adjacent infrared sensors may capture different thermal images that are spatially-aligned and time-aligned with each other. For example, the filters may be implemented with different spectral bands to capture different features in the thermal images (e.g., a gas of interest in one image and a background portion of a scene in another image). Such images may be advantageously used to detect the presence of gas with improved accuracy and high confidence.

In one embodiment, a system includes a first set of filters configured to pass first filtered infrared radiation comprising a first range of thermal wavelengths associated with a background portion of a scene; a second set of filters configured to pass second filtered infrared radiation comprising a second range of thermal wavelengths associated with a gas present in the scene, wherein the first and second ranges are independent of each other; and a sensor array comprising adjacent infrared sensors configured to separately receive the first and second filtered infrared radiation to capture first and second thermal images respectively corresponding to the background portion and the gas.

In another embodiment, a method includes passing, by a first set of filters, first filtered infrared radiation comprising a first range of thermal wavelengths associated with a background portion of a scene; passing, by a second set of filters, second filtered infrared radiation comprising a second range of thermal wavelengths associated with a gas present in the scene, wherein the first and second ranges are independent of each other; separately receiving, by adjacent infrared sensors of a sensor array, the first and second filtered infrared radiation; and separately capturing, by the adjacent infrared sensors, first and second thermal images respectively corresponding to the background portion and the gas in response to the received first and second filtered infrared radiation.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
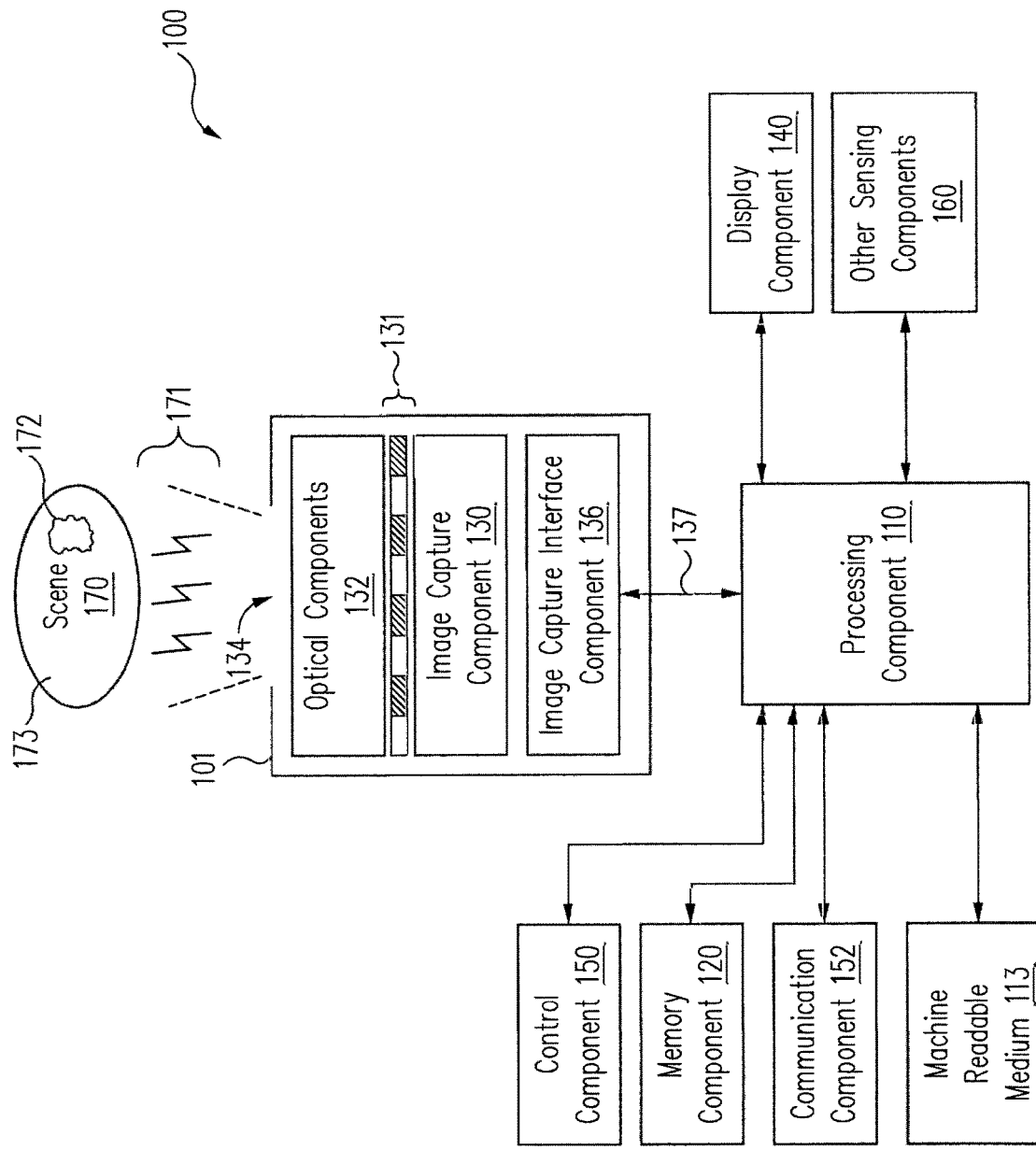
FIG. 1 illustrates a block diagram of an imaging system in accordance with an embodiment of the disclosure.

In accordance with various embodiments discussed herein, gas detection may be performed using a sensor array having at least two different types of filters associated with and distributed over the sensors of the array. For example, in some embodiments, such filters may be distributed in an alternating manner such that adjacent sensors of the array are associated with different filters. For example, filter types may alternate among rows, columns, or both (e.g., in a checkerboard pattern).

As a result, the sensor array may effectively capture at least two differently filtered images of a scene simultaneously. For example, a first image may include pixels associated with sensors receiving thermal radiation filtered by one filter type, and a second image may include pixels associated with sensors receiving thermal radiation filtered by another filter type.

By implementing at least two independent sets of filters corresponding to different independent spectral bands (e.g., wavelength ranges), the captured images may be used to detect gases of interest. For example, one set of "gas filters" may filter wavelengths associated with a gas to provide one thermal image with pixels corresponding to the sensor array's response at the gas wavelengths (e.g., a "gas image" made up of corresponding "gas pixels"). Another set of "no-gas filters" may filter wavelengths associated with background radiation of a scene to provide another thermal image with pixels corresponding to the sensor array's response at the background wavelengths (e.g., a "no-gas image" made up of corresponding "no-gas pixels").

Such an arrangement contrasts with conventional single-filter approaches in which only a portion of the sensors of an array may be filtered. In such single-filter approaches, only a subset of the sensors are filtered to generate an image used to identify background radiation, while the remaining unfiltered sensors are used to generate an image used to identify a gas of interest. As a result, the unfiltered sensors receive infrared radiation across a wide range of wavelengths, while the filtered sensors receive only a filtered portion of the infrared radiation. This can cause significant disparities in the response of filtered and unfiltered sensors of the array. In such cases, different integration periods and related calibrations must be implemented for the unfiltered and filtered sensors. Thus, images from the filtered and unfiltered images may not be fully captured at the same time.

Moreover, in conventional single-filter approaches, there is typically significant overlap in the wavelengths of thermal radiation received by the filtered and unfiltered sensors. For example, the background radiation filter may still pass at least a subset of the wavelengths associated with the gas of interest. Thus, a gas present in the imaged scene may cause both the filtered and unfiltered sensors to respond. This can significantly complicate and reduce the accuracy of gas visualization and quantification processes using the filtered and unfiltered images. For example, the unfiltered image may correspond to a broad range of wavelengths, resulting in low gas contrast. In addition, the filtered image may exhibit high Noise Equivalent Temperature Difference (NETD) values due to its narrow band, thus making quantification less accurate.

In contrast, the use of at least two independent sets of filters corresponding to different wavelength bands on adjacent infrared sensors as discussed herein permits two differently filtered images to be reliably captured and effectively processed. For example, because the alternating filters are distributed throughout the sensor array, the two filtered images are physically-aligned (e.g., to remove parallax between the images) and are time-aligned (e.g., simultaneously captured).

Also, because all sensors of the array are filtered (e.g., by the gas filters or the no-gas filters), extraneous out-of-band infrared radiation is removed and the resulting pixels therefore correspond only to the particular filtered wavelengths of interest. As a result, the sensors may be calibrated with the same integration periods (e.g., integration times) and exhibit acceptably low NETD values.

In addition, the filter ranges may be selected such that all of the sensors (e.g., receiving gas filtered or no-gas filtered infrared radiation) exhibit responses (e.g., captured voltages) corresponding to a desired range of pixel values of the captured thermal images. As a result, the captured thermal images may be more effectively processed, calibrated, and compared with each other.

Moreover, the gas image may exhibit low Noise Equivalent Concentration Length (NECL) and high gas contrast. In addition, the no-gas image may exhibit only minimal contributions from the absorption or emission associated with the gas of interest. Thus, the resulting gas and no-gas images may exhibit high image quality and can be used for accurate quantification and gas visualization.

Turning now to the drawings, FIG. 1 illustrates a block diagram of an imaging system 100 in accordance with an embodiment of the disclosure. Imaging system 100 may be used to capture and process images in accordance with techniques described herein. In some embodiments, various components of imaging system 100 may be provided in a camera component 101, such as an imaging camera. In other embodiments, one or more components of imaging system 100 may be implemented remotely from each other in a distributed fashion (e.g., networked or otherwise).

In some embodiments, imaging system 100 may be used to detect one or more gases of interest within a scene 170. For example, imaging system 100 may be configured to capture one or more images of scene 170 using camera component 101 (e.g., a thermal imaging camera) in response to infrared radiation 171 received from scene 170. Infrared radiation 171 may correspond to wavelengths that are emitted and/or absorbed by a gas 172 within scene 170, and other wavelengths that are emitted and/or absorbed by a background portion 173 of scene 170.

Captured images may be received by a processing component 110 and stored in a memory component 120. Processing component 110 may be configured to process the captured images in accordance with gas detection techniques discussed herein.

In some embodiments, imaging system 100 includes processing component 110, a machine readable medium 113, a memory component 120, image capture component 130, filters 131 (e.g., implemented by at least two sets of alternating filters 131A and 131B further discussed herein), optical components 132 (e.g., one or more lenses configured to receive infrared radiation 171 through an aperture 134 in camera component 101), an image capture interface component 136, a display component 140, a control component 150, a communication component 152, and other sensing components 160.

In some embodiments, imaging system 100 may be implemented as an imaging camera, such as camera component 101, to capture images, for example, of scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., infrared radiation 171) and provides representative data (e.g., one or more still images or video images). For example, imaging system 100 may represent a camera component 101 that is directed to detect infrared radiation and/or visible light and provide associated image data.

In some embodiments, imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive thermal images of scene 170.

In some embodiments, processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is configured to interface and communicate with the various components illustrated in FIG. 1 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100). As further discussed herein, image capture component 130 may be implemented as an array of infrared sensors having at least two different types of filters distributed among the various sensors of the array.

In some embodiments, processing component 110 may be configured to receive images from image capture component 130, process the images, store the original and/or processed images in memory component 120, and/or retrieve stored images from memory component 120. In various aspects, processing component 110 may be remotely positioned, and processing component 110 may be configured to remotely receive images from image capture component 130 via wired or wireless communication with image capture interface component 136, as described herein. Processing component 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Processing component 110 may be configured to display image data and information on display component 140. Processing component 110 may be configured to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Processing component 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, processing component 110 may be configured to communicate with image capture interface component 136 (e.g., by receiving data and information from image capture component 130). Image capture interface component 136 may be configured to receive images from image capture component 130 and communicate the images to processing component 110 directly or through one or more wired or wireless communication components (e.g., represented by connection 137) in the manner of communication component 152 further described herein. Camera component 101 and processing component 110 may be positioned proximate to or remote from each other in various embodiments.

In some embodiments, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
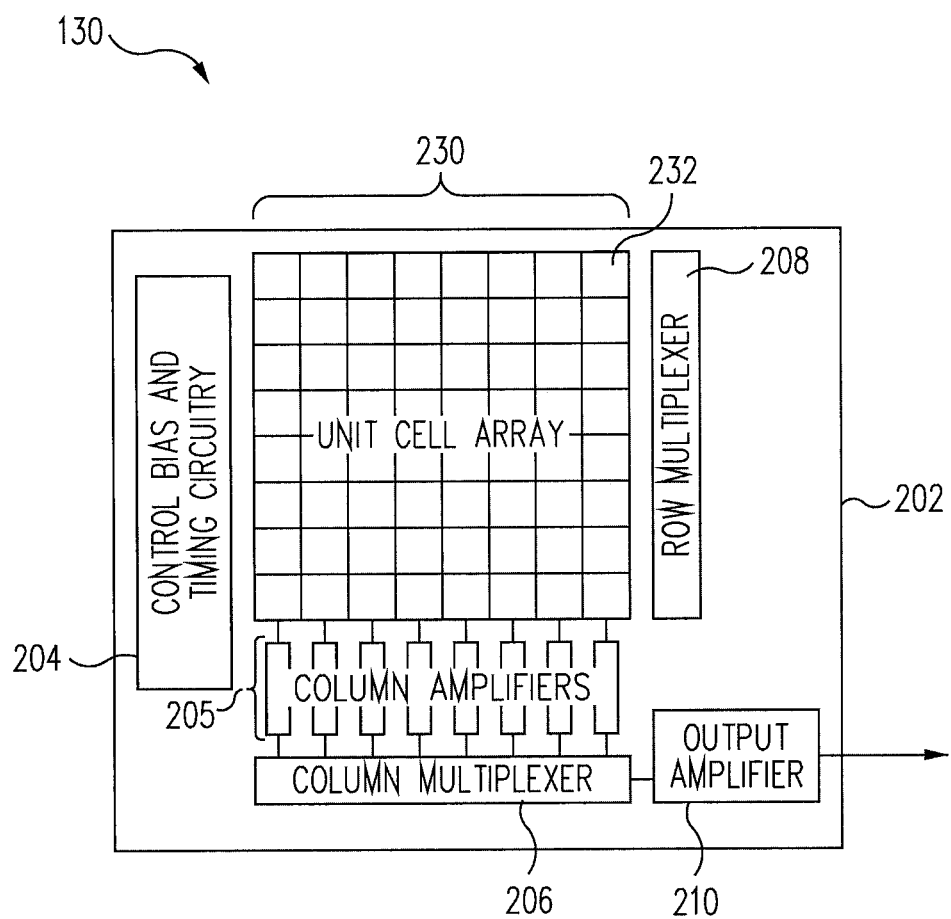
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including a sensor array 230 of infrared sensors 232 (e.g., implemented as unit cells) and a read out integrated circuit (ROIC) 202. Although an 8 by 8 array of infrared sensors 232 is shown, this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202. As further discussed herein, infrared sensors 232 may be associated with corresponding filters to permit at least two differently filtered images to be captured.

ROIC 202 includes bias generation and timing control circuitry 204, column amplifiers 205, a column multiplexer 206, a row multiplexer 208, and an output amplifier 210. Images captured by infrared sensors 232 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
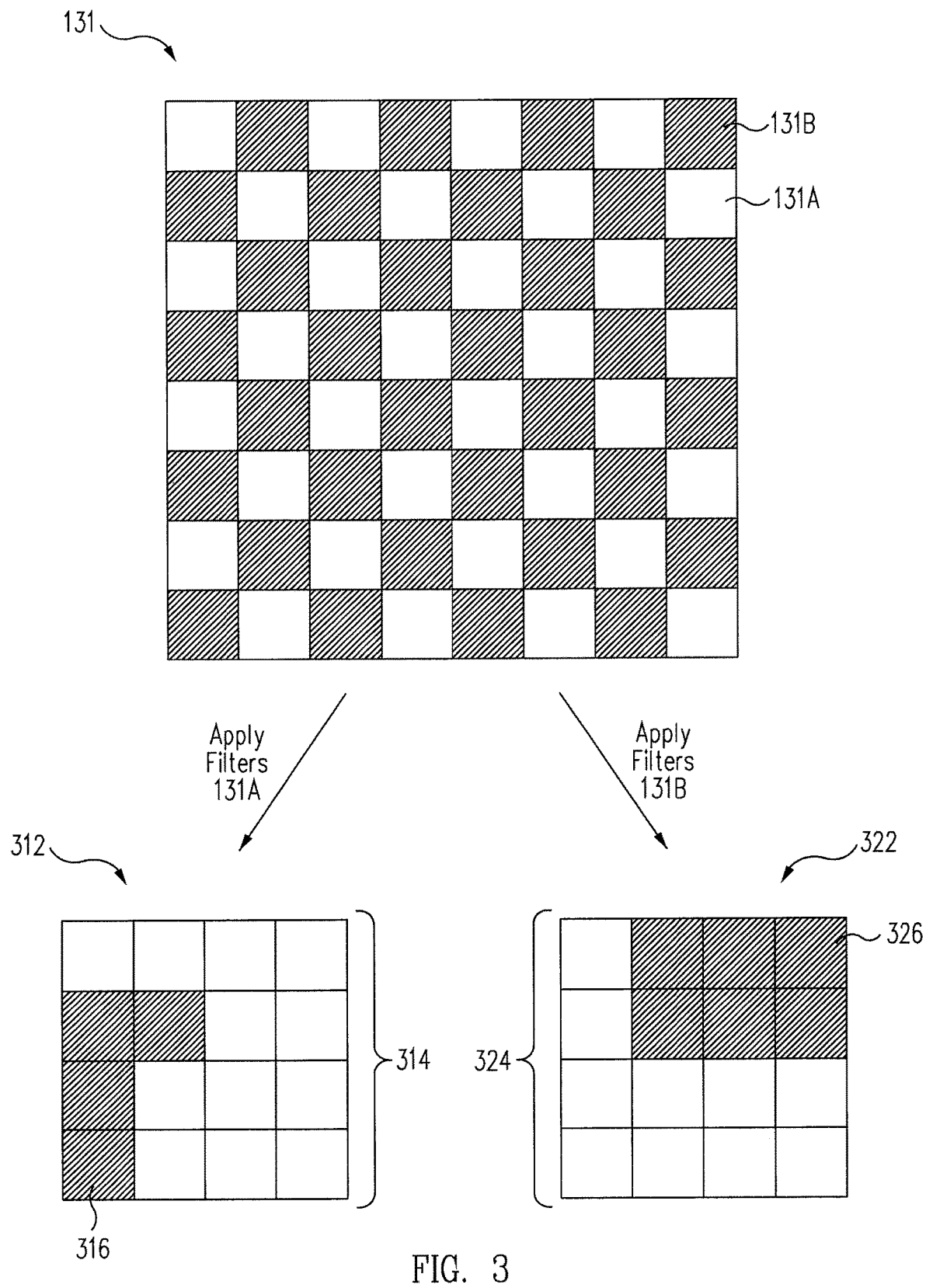
FIG. 3 illustrates a front view of filters and several captured images in accordance with an embodiment of the disclosure.
Figure 4:
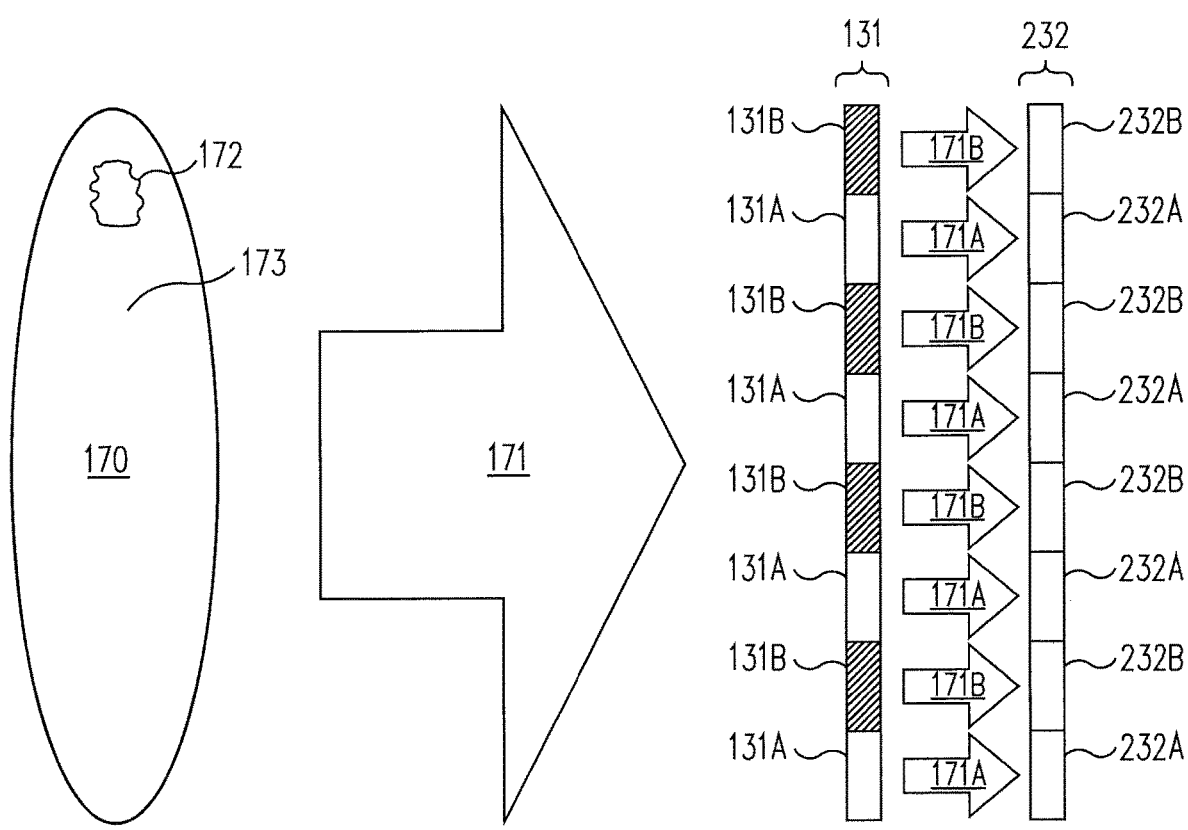
FIG. 4 illustrates a side view of filters disposed in front of infrared sensors and receiving infrared radiation from a scene in accordance with an embodiment of the disclosure.

FIG. 3 illustrates a front view of filters 131A and 131B and several captured images 312 and 322 in accordance with an embodiment of the disclosure. FIG. 4 illustrates a side view of filters 131A and 131B disposed in front of infrared sensors 232 and receiving infrared radiation 171 from scene 170 in accordance with an embodiment of the disclosure.

As shown in FIG. 3, two sets of filters 131A and 131B are provided in an alternating checkerboard pattern. In various embodiments, filters 131A and 131B may be implemented by one or more photo masks, substrates, coatings, and/or other materials positioned in front of infrared sensors 232. For example, filters 131A and 131B may be implemented as part of image capture component 130, optical components 132, and/or separately therefrom (e.g., interposed therebetween as shown in FIG. 1) in other appropriate portions of imaging system 100.

The operation of filters 131A and 131B is further illustrated in the side view of FIG. 4. As shown, adjacent sensors 232A and 232B (e.g., subsets of the infrared sensors 232 of array 230) of are optically aligned with filters 131A and 131B, respectively. Thermal radiation 171 received from scene 170 passes through filters 131A and 131B to provide filtered radiation 171A and 171B to corresponding infrared sensors 232A and 232B, respectively.

Referring again to FIG. 3, filters 131A may be implemented as no-gas filters configured to filter wavelengths associated with background radiation of scene 170 to provide a resulting no-gas image 312 with no-gas pixels 314 corresponding to the response of infrared sensors 232A at the no-gas filtered wavelengths. In the example gas image 312, several pixels 316 are shaded which correspond to portions of filtered radiation 171A associated with background radiation (e.g., background portion 173) passed by filters 131A.

Filters 131B may be implemented as gas filters configured to filter wavelengths associated with a gas of interest to provide a resulting gas image 322 with gas pixels 324 corresponding to the response of infrared sensors 232B at the gas filtered wavelengths. In the example gas image 322, several pixels 326 are shaded which correspond to portions of filtered radiation 171B associated with a gas of interest (e.g., gas 172) passed by filters 131B.

Because filters 131A and 131B are distributed throughout the sensor array, the resulting no-gas image 312 and gas image 322 are effectively aligned with each other with no parallax. In addition, because filters 131A and 131B restrict the wavelengths received by their corresponding infrared sensors 232A and 232B, all of infrared sensors 232A and 232B may be operated with the same (e.g., identical) integration periods, gain settings, and readout frame rates.

Figure 5:
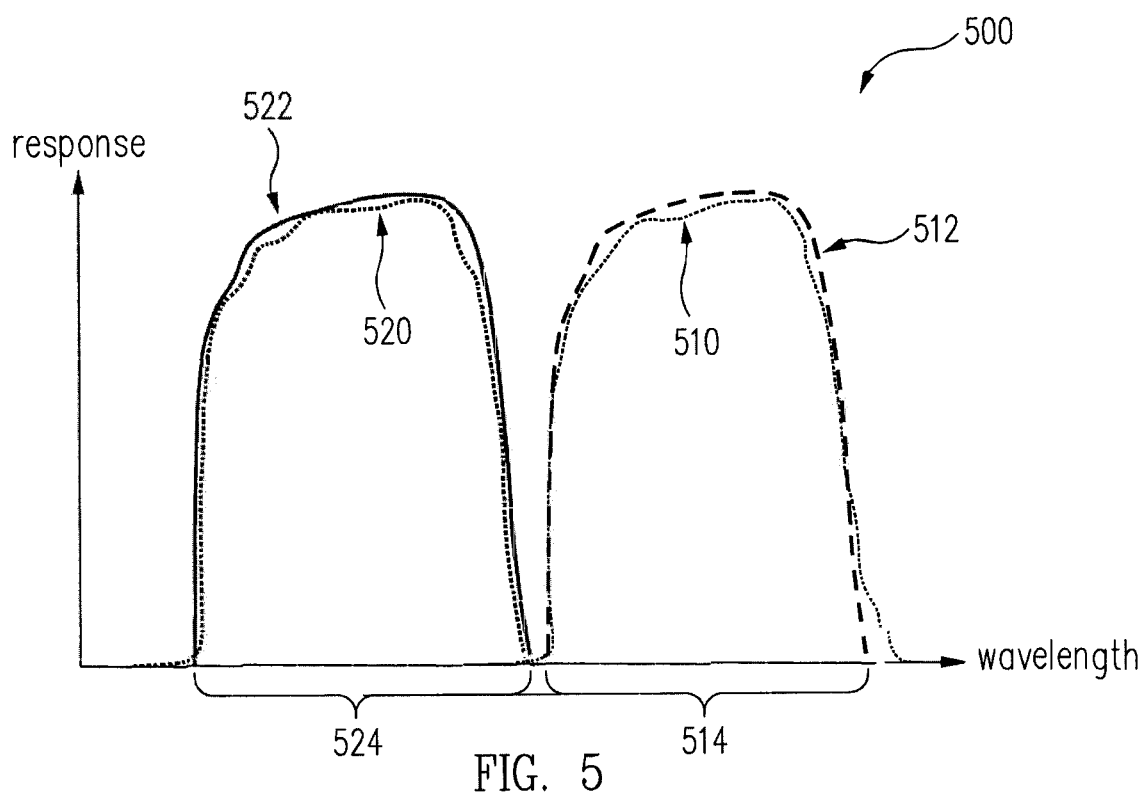
FIG. 5 illustrates several filter response plots in accordance with an embodiment of the disclosure.

FIG. 5 illustrates a graph 500 with several filter response plots 510 and 520 in accordance with an embodiment of the disclosure. Plot 510 identifies the frequency response of no-gas filters 131A. No-gas filters 131A pass wavelengths over a range corresponding to a no-gas band 514 to provide filtered radiation 171A to infrared sensors 232A (see FIG. 4) which provide no-gas image 312 with gas pixels 314 having a response corresponding to plot 512.

Plot 520 identifies the frequency response of gas filters 131B. Gas filters 131B pass wavelengths over a range corresponding to a gas band 524 to provide filtered radiation 171B to infrared sensors 232B (see FIG. 4) which provide gas image 322 with gas pixels 324 having a response corresponding to plot 522.

As shown in FIG. 5, in some embodiments, no-gas filters 131A and gas filters 131B may be non-overlapping with no-gas band 514 and gas band 524 separated from each other. Such separation may permit gas 172 to be further distinguished from background portion 173 in those embodiments. In other embodiments, no-gas filters 131A and gas filters 131B may be implemented such that no-gas band 514 and gas band 524 at least partially overlap with each other.

Figure 6:
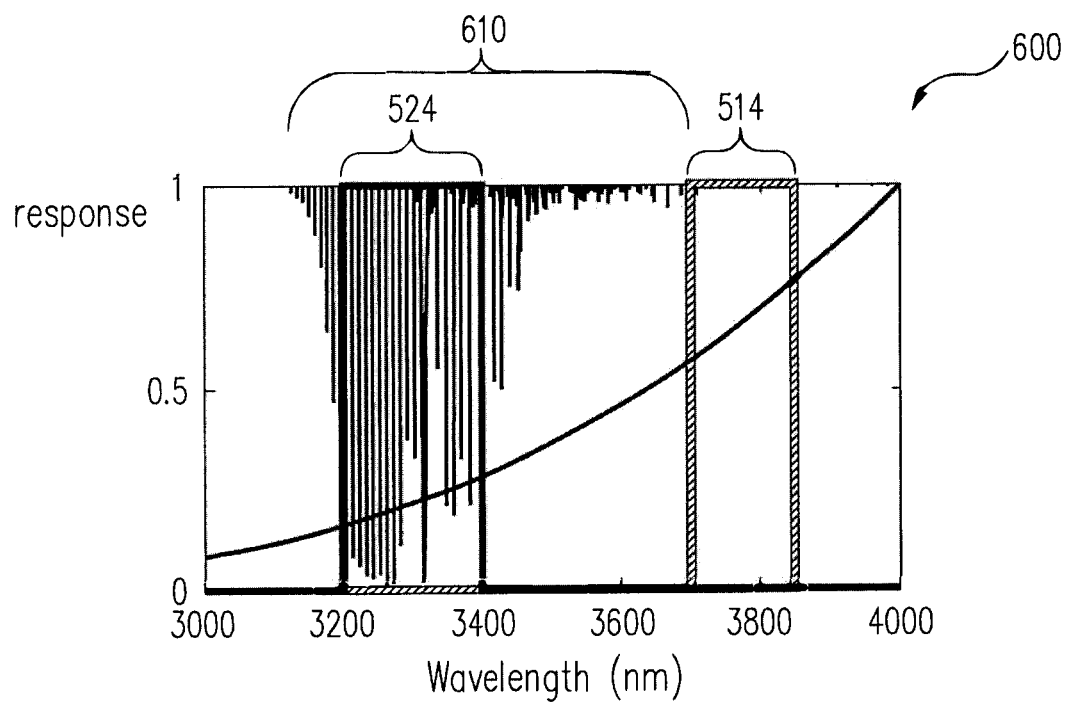
FIG. 6 illustrates infrared radiation received at various wavelengths in accordance with an embodiment of the disclosure.

FIG. 6 illustrates a graph 600 of infrared radiation 171 received at various wavelengths in accordance with an embodiment of the disclosure. In particular, graph 600 identifies the relative amounts of emission and/or absorption of infrared radiation 171 associated with various wavelengths over a range from about 3000 nm to about 4000 nm.

As shown, significant absorption and/or emission activity is evident over a wavelength range 610 from about 3100 nm to about 3700 nm, and very little or no such activity outside wavelength range 610. Therefore, if a particular gas of interest is known to exhibit activity in wavelength range 610, then the gas filters 131B may be implemented with an appropriate gas band 524 within wavelength range 610. Thus, in the embodiment illustrated in FIG. 6, gas band 524 is implemented with a range of about 3200 nm to about 3400 nm to correspond with the absorption and/or emission activity associated with the particular gas 172 represented in graph 600.

Similarly, if general background radiation is known to be outside wavelength range 610, then the no-gas filters 131A may be implemented with an appropriate no-gas band 514 outside wavelength range 610. Thus, in the embodiment illustrated in FIG. 6, no-gas band 514 is implemented with a range of about 3700 nm to about 3850 nm to correspond with the absorption and/or emission activity associated with the background portion 173 represented in graph 600.

As shown in FIG. 6, the selected gas band 524 and no-gas band 514 are relatively narrow (e.g., ranging only several hundred nm) and do not overlap with each other. As such, no-gas image 312 and gas image 322 corresponding to filters 131A and 131B, respectively, may be used to distinguish gas 172 from background portion 173 with high contrast.

The widths and positions of no-gas band 514 and gas band 524 may be selected independently and as desired (e.g., based on the particular implementation of filters 131A and 131B) such that the resulting no-gas image 312 and gas image 322 are balanced with each other (e.g., with gas pixels 314 and no-gas pixels 324 exhibiting useful values for image comparison and processing when infrared sensors 232A and 232B are implemented with the same integration periods and gain settings).

Such implementations may permit the simultaneous capture of no-gas image 312 and gas image 322 without requiring modification to sensor array 230. For example, in some embodiments, the independent selection of no-gas band 514 and 524 may permit sensor array 230 to be implemented with standard (e.g., preset) integration periods. In this regard, the implementation of filters 131A and 131B may be tuned for use with a conventional FPA, thus reducing the complexity, cost, and reliability of system 100.

In some embodiments, filters 131A and 131B may be positioned in front of infrared sensors 232 without requiring modification to the pitch or number of infrared sensors 232 of sensor array 230. As discussed, filters 131A and 131B may be implemented, for example, by one or more photo masks, substrates, coatings, and/or other materials positioned in front of infrared sensors 232. Such implementations thus also permit a conventional FPA to be used for reducing the complexity, cost, and reliability of system 100.

In some embodiments, no-gas filters 131A and gas filters 131B may be optimized (e.g., the widths of no-gas band 514 and gas band 524 may be tuned) to provide desired responses by infrared sensors 232A and 232B such that no-gas image 312 and gas image 322 are balanced with each other (e.g., resulting in pixels 314 and 324 having values within in a desired range) when sensors 232A and 232B are operated with the same integration periods and gain settings.

In some embodiments, no-gas filters 131A may be implemented with a narrow no-gas band 514 to minimize the gas wavelengths passed by no-gas filters 131A. This may effectively reduce the amount of gas response in no-gas pixels 314 (e.g., reducing the gas evident in no-gas image 312).

In some embodiments, decreasing the width of gas band 524 may provide a more gas-specific response in gas pixels 324 (e.g., increasing the gas content evident in gas image 322), thus increasing the contrast between gas 172 and background portion 173 in a resulting differential image at the expense of increased NETD values associated with gas image 322. Thus, the width of gas band 524 may be selected to achieve a desired tradeoff between contrast and noise for a desired implementation.

It will be understood that the particular no-gas band 514, gas band 524, and wavelength range 610 represented in FIG. 6 are provided merely for purposes of example. As such, any desired bands or ranges may be used as appropriate.

Figure 7:
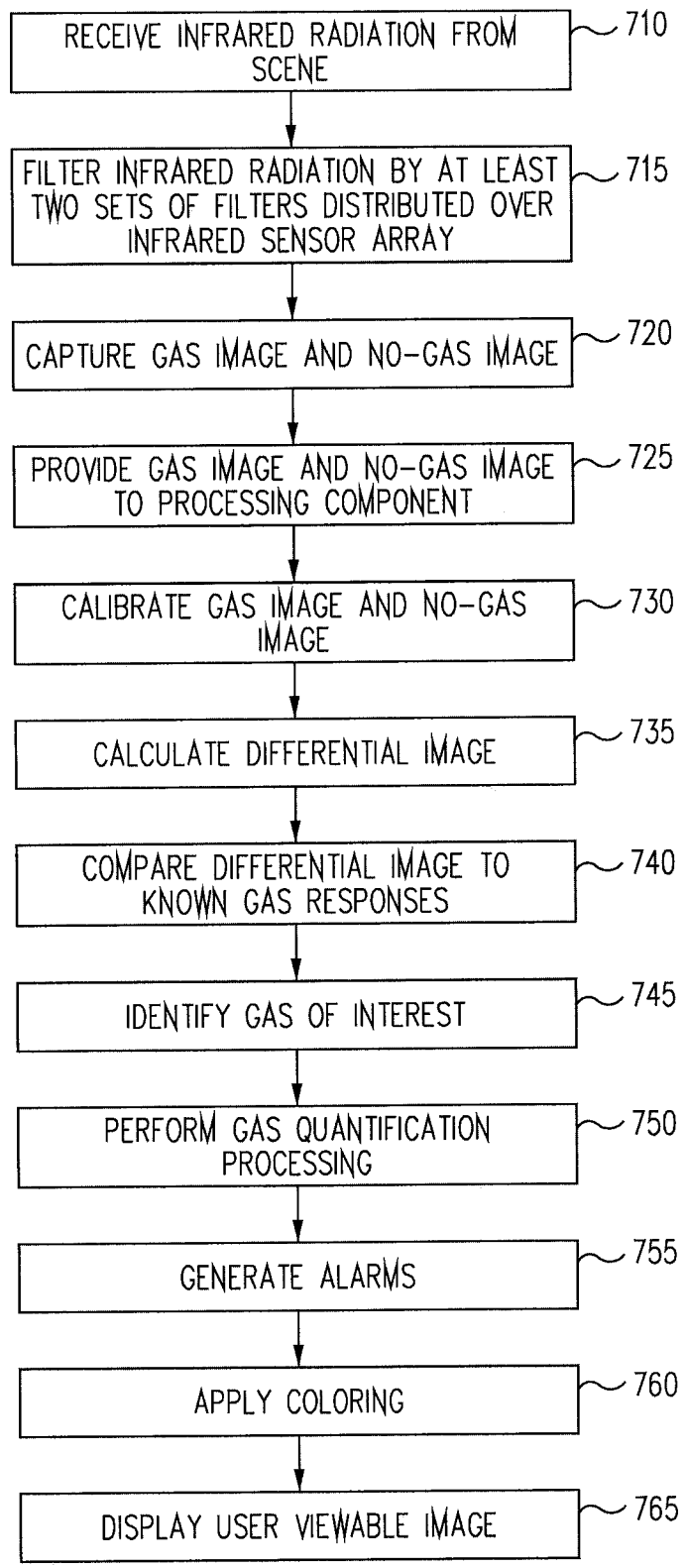
FIG. 7 illustrates a process of performing thermal imaging using alternating filters in accordance with an embodiment of the disclosure.

FIG. 7 illustrates a process of performing thermal imaging using alternating filters 131A and 131B in accordance with an embodiment of the disclosure. In block 710, system 100 receives infrared radiation 171 from scene 170. As discussed, infrared radiation 171 may include wavelengths that are emitted and/or absorbed by gas 172 within scene 170, and other wavelengths that are emitted and/or absorbed by background portion 173 of scene 170. Infrared radiation 171 passes through aperture 134 and optical components 132 which cause infrared radiation 171 to be directed and focused toward sensor array 230 of image capture component 130.

In block 715, filters 131A and 131B receive and filter infrared radiation 172 into at least two wavelength bands corresponding to no-gas band 514 and gas band 524 to provide filtered radiation 171A and 171B, respectively, as discussed.

In block 720, infrared sensors 232A and 232B of sensor array 230 receive filtered radiation 171A and 171B and capture no-gas image 312 and gas image 322, respectively. As discussed, the use of at two independent sets of filters 131A and 131B distributed throughout sensor array 230 in an alternating manner permits no-gas image 312 and gas image 322 to be physically-aligned with each other with no parallax, and also time-aligned through simultaneous capture. As also discussed, because all sensors of the array are filtered, the same integration periods may be used for sensors 232A and 232B (e.g., sensor array 230 may be implemented with standard integration periods and/or conventional implementations in some embodiments as discussed).

In block 725, ROIC 202 provides no-gas image 312 and gas image 322 from image capture component 130 to image capture interface component 136 which provides them to processing component 110 over connection 137.

In block 730, processing component 110 calibrates no-gas image 312 and gas image 322. In some embodiments, this may include calibrating images 312 and 322 against each other, performing radiometric calibrations on images 312 and 322, and/or other processing. In some embodiments, this may include adjusting the gains of no-gas pixels 314 and/or gas pixels 324 such that the overall pixel values (e.g., digital counts determined from voltages captured by infrared sensors 232) are comparable to each other.

As discussed, because all infrared sensors 232 are filtered by either no-gas filters 131A or gas filters 131B, extraneous out-of-band infrared radiation is removed and the resulting no-gas pixels 314 and gas pixels 324 of no-gas image 312 and gas image 322 therefore correspond only to the particular filtered wavelengths of interest. As also discussed, gas band 514 and no-gas band 524 may be selected such that all of infrared sensors 232A and 232B exhibit responses corresponding to a desired range of pixel values for no-gas image 312 and gas image 322. As a result, no-gas image 312 and gas image 322 can be more effectively calibrated in block 730. This calibration can significantly improve the quality of a differential image generated from no-gas image 312 and gas image 322 (e.g., providing greater contrast between gas 172 and background portion 173 to better distinguish between them in the differential image), which consequently provides more reliable quantification and more accurate alarms (further discussed herein).

In block 735, processing component 110 generates a differential thermal image based on the calibrated no-gas image 312 and the calibrated gas image 322. For example, processing component 110 may subtract either of the captured images from the other. It will be understood that such subtraction may be performed accurately and with high confidence because the original no-gas image 312 and the original gas image 322 are captured in a spatially-aligned and time-aligned manner in accordance with the techniques discussed herein. The resulting differential thermal image will therefore exhibit high contrast between its no-gas and gas portions for use in further processing as discussed herein.

In block 740, processing component 110 compares the gas band response evident in the differential thermal image to one or more known gas band responses (e.g., stored in a database or other data structure maintained in machine readable medium 113 and/or memory component 120). In this regard, processing component 110 may determine whether the differential thermal image exhibits significant absorption and/or emission patterns associated with one or more known gases in the database. In block 745, processing component 110 identifies the particular gas 172 in scene 170 based on the comparison of block 740.

In block 750, processing component 110 performs gas quantification processing based on the differential thermal image and/or one or more of images 312 and 322. In various embodiments, such processing may include, for example, generation and analysis of one or more concentration length (CL) images, gas flow calculations, and/or other operations.

In block 755, processing component 100 generates one or more alarms in response to the identification and/or quantification of blocks 745 and/or 750. For example, in various embodiments, such alarms may be communicated to a user through display component 140, communication component 152, and/or other components using various media such as text, graphics, audio signals, and/or other ways as appropriate.

As discussed, the use of separate filters 510 and 520 corresponding to gas band 514 and no-gas band 524 permit the differential image to exhibit increased contrast between gas 172 and background portion 173. Such increased contrast (e.g., through further separation of gas 172 from background portion 173 in the differential image) can permit processing component 110 to better distinguish between gas 172 and background portion 173 in the differential image, thus improving the accuracy of the gas identification of block 745, the gas quantification of block 750, and/or the alarm generation of block 755 (e.g., reduced false alarm rates).

In block 760, processing component 110 applies coloring to the differential thermal image to provide a user viewable image. In block 765, processing component 110 provides the user viewable image to display component 140 for display and/or further manipulation by a user of system 100.

In view of the present disclosure, it will be appreciated that the use of at least two independent sets of filters corresponding to different wavelength bands as discussed herein permits two differently filtered images to be reliably captured and effectively processed for use in gas detection. Such an approach permits the differently filtered images to be captured without parallax and without undue mechanical or optical complexity. Moreover, the use of narrow wavelength bands permits gases of interest to be detected with high contrast for improved accuracy.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a first set of filters configured to pass first filtered infrared radiation comprising a first range of thermal wavelengths associated with a background portion of a scene;
a second set of filters configured to pass second filtered infrared radiation comprising a second range of thermal wavelengths associated with a gas present in the scene, wherein the first and second ranges are independent of each other;
a sensor array comprising adjacent infrared sensors configured to separately receive the first and second filtered infrared radiation to simultaneously capture first and second thermal images respectively corresponding to the background portion and the gas;
a processor configured to:
generate a differential image using the first and second thermal images to distinguish between the gas and the background portion of the scene, and
calibrate the first and second thermal images against each other before the differential image is generated to further distinguish between the gas and the background portion of the scene; and
wherein the first and second filters are arranged in an alternating pattern, the adjacent infrared sensors are configured to separately receive the first and second filtered infrared radiation according to the alternating pattern, and the alternating pattern aligns the first and second thermal images with each other to prevent parallax between the first and second thermal images.

2. The system of claim 1, wherein:
the alternating pattern is an alternating checkerboard pattern.

3. The system of claim 1, wherein the first and second ranges are non-overlapping and separated from each other to increase contrast between the gas and the background portion of the scene in the first and second thermal images.

4. The system of claim 1, wherein the first and second wavelength ranges cause the adjacent infrared sensors to exhibit responses corresponding to a desired range of pixel values of the first and second thermal images.

5. The system of claim 1, wherein the first and second filters are implemented by one or more substrate layers disposed between the infrared sensors and the scene.

6. The system of claim 1, wherein the first and second wavelength ranges are selected to permit the adjacent infrared sensors to be operated with identical integration times and capture the first and second thermal images simultaneously.

7. The system of claim 6, wherein the first and second wavelength ranges are selected to permit the adjacent infrared sensors to be operated with identical gain settings to provide associated pixel values within a desired range for comparison and processing of the first and second thermal images.

8. The system of claim 1, wherein the processor is configured to:
process the differential image to quantify the gas.

9. The system of claim 8, wherein the processor is configured to generate a user viewable image using the differential image.

10. The system of claim 9, further comprising a display component configured to display the user viewable image.

11. A method comprising:
passing, by a first set of filters, first filtered infrared radiation comprising a first range of thermal wavelengths associated with a background portion of a scene;
passing, by a second set of filters, second filtered infrared radiation comprising a second range of thermal wavelengths associated with a gas present in the scene, wherein the first and second ranges are independent of each other;
separately receiving, by adjacent infrared sensors of a sensor array, the first and second filtered infrared radiation;
separately simultaneously capturing, by the adjacent infrared sensors, first and second thermal images respectively corresponding to the background portion and the gas in response to the received first and second filtered infrared radiation;

generating, by a processor, a differential image using the first and second thermal images to distinguish between the gas and the background portion of the scene;

calibrating, by the processor, the first and second thermal images against each other prior to the generating to further distinguish between the gas and the background portion of the scene; and wherein the first and second filters are arranged in an alternating pattern, the adjacent infrared sensors are configured to separately receive the first and second filtered infrared radiation according to the alternating pattern, and the alternating pattern aligns the first and second thermal images with each other to prevent parallax between the first and second thermal images.

12. The method of claim 11, wherein:
the alternating pattern is an alternating checkerboard pattern.

13. The method of claim 11, wherein the first and second ranges are non-overlapping and separated from each other to increase contrast between the gas and the background portion of the scene in the first and second thermal images.

14. The method of claim 11, wherein:
the simultaneously capturing comprises simultaneously capturing voltages corresponding to pixel values of the first and second thermal images; and
wherein the first and second wavelength ranges cause the pixel values to correspond to a desired range of pixel values.

15. The method of claim 11, wherein the first and second filters are implemented by one or more substrate layers disposed between the infrared sensors and the scene.

16. The method of claim 11, wherein the first and second wavelength ranges are selected to permit the adjacent infrared sensors to be operated with identical integration times and capture the first and second thermal images simultaneously.

17. The method of claim 16, wherein the first and second wavelength ranges are selected to permit the adjacent infrared sensors to be operated with identical gain settings to provide associated pixel values within a desired range for comparison and processing of the first and second thermal images.

18. The method of claim 11, further comprising:
processing the differential image to quantify the gas.

19. The method of claim 18, further comprising generating a user viewable image using the differential image.

20. A system configured to perform the method of claim 11, the system comprising:
the first set of filters;
the second set of filters;
the sensor array; and
the processor.

* * * * *